United States Patent [19]

Rayson et al.

[11] Patent Number: 5,761,689
[45] Date of Patent: Jun. 2, 1998

[54] AUTOCORRECTING TEXT TYPED INTO A WORD PROCESSING DOCUMENT

[75] Inventors: Steven J. Rayson; Dean J. Hachamovitch; Andrew L. Kwatinetz; Stephen M. Hirsch, all of Seattle, Wash.

[73] Assignee: Microsoft Corporation, Redmond, Wash.

[21] Appl. No.: 299,497

[22] Filed: Sep. 1, 1994

[51] Int. Cl.$^6$ .................................................. G06F 17/00
[52] U.S. Cl. .................................................. 707/533
[58] Field of Search .......................... 364/419.1–419.17; 395/792–803; 707/530–540

[56] References Cited

U.S. PATENT DOCUMENTS

| | | | |
|---|---|---|---|
| 4,328,561 | 5/1982 | Convis et al. | 364/900 |
| 4,396,992 | 8/1983 | Hayashi et al. | 364/900 |
| 4,459,049 | 7/1984 | Howell et al. | 400/98 |
| 4,464,070 | 8/1984 | Hanft et al. | 400/98 |
| 4,650,349 | 3/1987 | Westreich | 400/98 |
| 4,777,596 | 10/1988 | Shaffer et al. | 364/300 |
| 4,830,521 | 5/1989 | Sakai et al. | 364/419.12 |
| 4,907,173 | 3/1990 | Yamada et al. | 364/419.14 |
| 4,916,656 | 4/1990 | Sasaki | 364/419.14 |
| 5,258,909 | 11/1993 | Damerau et al. | 364/419.22 |
| 5,576,955 | 11/1996 | Newbold et al. | 395/803 |
| 5,600,556 | 2/1997 | Takenaka | 395/803 |

FOREIGN PATENT DOCUMENTS

| | | | |
|---|---|---|---|
| 0054658 | 6/1982 | European Pat. Off. | G06F 15/20 |
| 04742574A2 | 3/1992 | European Pat. Off. | G06F 15/20 |

OTHER PUBLICATIONS

Honeywell Software EMACS Text Editor User's Guide, Dec. 1979, 15 pp.
Macintosh Version Word 4.0 User's Guide, 1989, p. 290.
UniPress Software EMACS Screen Editor Manual, Version 2, Copyright 1985, 5 pp.

*Primary Examiner*—Almis R. Jankus
*Attorney, Agent, or Firm*—Ronald M. Anderson

[57] ABSTRACT

A method and word processing system for automatically replacing one or more characters of text entered by a user in a word processing document with the corresponding plain text, formatted text, or other object. The user can select among a plurality of predefined autocorrect options in an Autocorrect dialog box that is displayed when the autocorrect function is selected from the menu or toolbar of the word processing system. These options include changing straight quotes to smart quotes, correcting words that begin with two initial upper case letters so that only the first letter is upper case, capitalizing the first letter of any sentence that is not capitalized, capitalizing the names of the days of the week if not already capitalized, and replacing text entered by the user with either plain text, formatted text, a graphic picture, or other type of object. Using the autocorrect function, the user can automatically correct commonly misspelled words, and automatically expand relatively short groups of characters to longer words, paragraphs, or graphic objects. Each character or string of characters that is to be replaced is associated with a "definition" entered as plain text, formatted text, or as an object. The entry is added to an autocorrect list displayed to the user in the Autocorrect dialog box. Any entry in the autocorrect list can also be deleted or changed by the user. A second embodiment makes an intelligent decision concerning autocorrection of text, based upon the time interval between keyboard events.

39 Claims, 8 Drawing Sheets

AUTOCORRECTING TEXT TYPED INTO A WORD PROCESSING DOCUMENT

FIELD OF THE INVENTION

This invention generally relates to a method and a system for replacing text entered on a computer with different text, and more specifically, to a method for replacing a first predefined set of characters entered in a word processing system with a second predefined set of characters, and to a word processing system having that capability.

BACKGROUND OF THE INVENTION

Word processing systems running on personal computers have done much to reduce the effort required to create and edit documents. With each revision of word processing software that is released, additional features are included that further improve the efficiency with which documents are created and revised. One such feature, referred to in the prior art as a "glossary function," enables a user to enter one or more characters as part of a glossary entry. The short string of characters comprising a portion of the glossary entry is associated by the user with the other portion of the glossary entry that comprises a word, phrase, or section of text. Thereafter, the user can type the short string of characters previously entered into the glossary, followed by a function key, and the short string of characters will be replaced with its associated word, phrase, or section of text that forms the remainder of the glossary entry. For example, if drafting a legal contract, glossary entries including different form paragraphs can be stored in a template for the contract. One of the glossary entries might include a two letter combination "nd" associated with a non-disclosure paragraph that is often inserted into such contracts. By typing "nd" followed by the appropriate function key (F3 in Word and Word for Windows™), the non-disclosure clause that was previously stored in the glossary will be inserted into the contract, replacing the "nd" characters that were just entered. Glossary entries can be selectively used, either in specific document templates, or in all templates in the word processing system.

Since a user may forget the glossary entry character(s) associated with a particular replacement text, the user can also invoke the glossary function by selecting "glossary" from the menu, which opens a glossary list. From this list, the user can select the required glossary entry.

Although the glossary function is a wonderful addition to word processing, it requires that the user specifically activate the replacement of the short character string of the glossary entry by pressing one of the function keys. Under most circumstances, a user may prefer that a predefined string of characters always be replaced with another predefined set of characters—without the need to selectively activate the replacement. In addition, it may often be desirable to replace a predefined string of characters with other objects, such as bitmaps, or spreadsheets—again, without requiring the user to initiate the replacement with a function key or other control key combination. Currently, no prior art word processing system offers this automated text replacement capability.

It would also be desirable to extend the automatic text replacement capability discussed above to provide more versatility. Certain types of common spelling and typographical errors occur repetitively in documents. Although these errors may be apparent and easily corrected upon redrafting the document, it would be helpful if the word processing system could recognize such errors and automatically correct them as the user begins to type the next word. This feature would be much more efficient than a real time spelling checker, since it would only replace specific misspelled words with the corresponding correct words. In addition, the function should be able to detect other types of errors and automatically correct them. For instance, it would be desirable to automatically correct improper capitalization of certain words. Once again, none of the prior art word processing systems provide such an autocorrecting feature.

SUMMARY OF THE INVENTION

In accordance with the present invention, a method is defined for automatically replacing an entry made by a user in a computer display with a replacement. The method begins with the step of enabling the user to indicate the entry that will be automatically replaced and then stores the indication. The user is also enabled to identify the replacement that will automatically replace the entry so that the identification of the replacement will be stored in relationship to the entry. Characters entered by the user are scanned to detect if the user has entered the characters comprising the entry, and to determine if a delimiter character was entered after the characters comprising the entry. The entry is automatically replaced with the replacement.

In one aspect of the invention, the replacement comprises a plurality of characters. However, the replacement can also comprise a graphic representation or virtually any object that can be displayed.

The method further includes the steps of storing a plurality of entries in a list. Each entry in the list corresponds to a different replacement that automatically replaces that entry when the entry is entered by the user, in accordance with the steps noted above.

In another feature of the invention, the replacement comprises one of an opening curly quote (") and a closing curly quote ("). In this instance, the entry comprises a straight quote (") and the method includes the steps of detecting a first straight quote as it is entered by the user. The first straight quote is replaced with the opening curly quote. Thereafter, a second straight quote is detected as it is entered at a point in the word processing document following the first straight quote, and is replaced with the closing curly quote.

In yet another aspect of the method, the entry comprises a first and a second character of any word, which are upper case characters and are followed by at least one lower case character. In this instance, the replacement comprises the second character of the word in lower case. The method is thus useful for correcting typographical errors in which the user mistakenly enters a word that has two initial upper case or capital characters.

The entry can also comprise any day of the week that has an initial lower case character. If such an entry is detected, the replacement comprises the corresponding day of the week with an initial upper case character, and both singular and plural forms of the days are included. The method is therefore used to correct typographical errors in which any of the days of the week are entered by the user (singular or plural form) with an initial lower case character.

Another correction can be automatically made if the entry comprises a lower case character that is the initial character of a first word in a sentence. Once such an error is detected, the replacement comprises a corresponding upper case character for the initial character of the first word.

Optionally, the replacement is stored in a binary file format that supports rich text to indicate any objects that are included and any formatting and style data that should be applied to the replacement. If the entry comprises a word, both a case used for characters comprising the word and a position of the word in the text preferably determine the case of the characters comprising the replacement.

A "smart retyping" capability is also part of the present method. If the user does not want the autocorrect replacement to occur, the user can either change the predefined replacement made in the document back to the original text or can undo the replacement by issuing an Undo command.

A further aspect of the present invention is directed to a word processing system that implements the autocorrect function. The word processing system includes a central processing unit (CPU), a memory for storing program instructions for causing the computer to operate as a word processing system, a display, a user interface that enables the user to enter text and commands when creating a document, and a non-volatile storage unit for storing the document. The program instructions further cause the CPU to carry out functions that are substantially like those implemented in the steps of the method discussed above.

In accordance with a second embodiment, a time interval between a plurality of predefined keyboard events is determined as a user types on a computer keyboard. At least one character of a current word is replaced if the time interval between the predefined keyboard events is less than a predetermined value, which is selected as being indicative that the user has typed a typographical error. The replacement is then entered to correct the typographical error.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Overview of Word Processing System with Autocorrect Function

Figure 1:
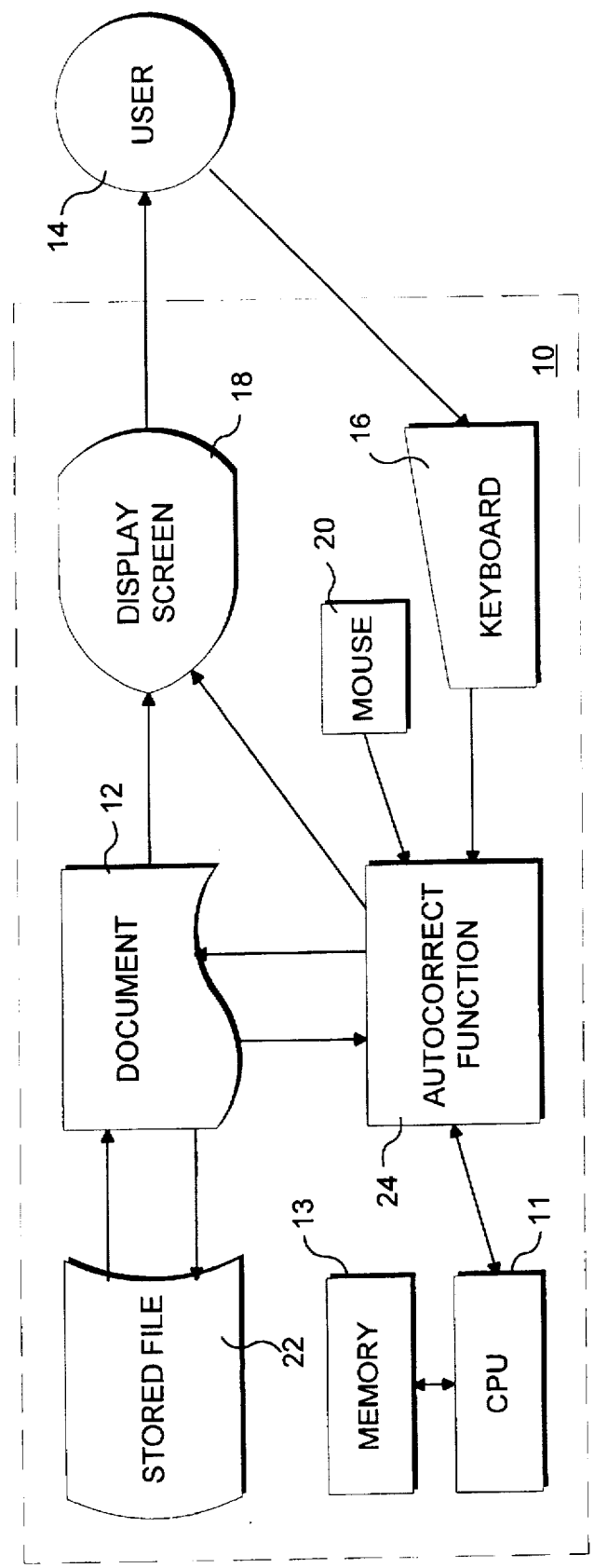
FIG. 1 is a block diagram illustrating the components of a word processing system in relationship to the autocorrecting function of the present invention.

With reference to FIG. 1, a block diagram shows the functional components of a personal computer 10 on which is executed a word processing system in accordance with the present invention. Personal computer 10 implements the present invention when it executes programmed instructions that control a CPU 11 disposed within the personal computer, causing the CPU to carry out a variety of word processing functions, including the autocorrect function described below. The program instructions that control CPU 11 are loaded into a memory 13 from a stored file on a non-volatile storage unit 22, such as a hard drive.

Personal computer 10 is generally conventional in design, and details concerning its operation and structure need not be explicitly disclosed herein to provide an enabling disclosure of the present invention, since such details are well known to those of ordinary skill in the art. In addition to CPU 11 and memory 13, personal computer 10 includes a keyboard 16, a display screen 18 on which a document 12 that is created by a user 14 is displayed to the user, along with menus and other aspects of the word processing system (not shown) that enable user 14 to interact with the word processing system and control its operation. Also included in personal computer 10 is a mouse 20 or other pointing device that is used to control a cursor on display screen 18 and for selecting text and control options.

In the preferred embodiment, personal computer 10 employs a graphics user interface, such as WINDOWS™ Version 3.1, a product of Microsoft Corporation. Furthermore, the preferred embodiment of the word processing system is presently implemented in WORD FOR WINDOWS™ Version 6 (hereinafter referred to as WinWord 6), also a product of Microsoft Corporation. However, it should be understood that the autocorrect function can also be implemented in text word processing systems and in other graphics word processing programs running under other graphics user interfaces, such as System 7™, which is used on MACINTOSH™ computers produced by Apple Computer Corporation.

In connection with the preferred embodiment of the present invention embodied in WinWord 6, CPU 11 is preferably an Intel Corporation type 80386, 80486, or PENTIUM™ processor, although other types of CPUs capable of executing WinWord 6 under Windows 3.1 and other variations of that operating system can also be used for this purpose. Clearly, since other types of computers that run text based and graphics based word processing systems in which the present invention can be employed, use of different CPUs in connection with the present invention is clearly contemplated. Personal computer 10 may be a desktop computer, a portable or laptop computer, or a workstation running on a network.

A block 24 illustrates how the autocorrect function, which is actually a part or module of the word processing program executing on CPU 11, interacts with the other components of personal computer 10 to provide the functions described below. Input of text or control selections by user 14 through keyboard 16 or through mouse 20 represent the interaction of user 14 with the autocorrect function. For example, the user can employ the keyboard and/or mouse to set options and to define entries in a list that are to be implemented by the autocorrect function as the user enters text on keyboard 16. The options selected by the user are preferably stored in a default template file (normal.dot) and in a file winword.opt on hard drive 22. Replacement of text entered by user 14 appears on display screen 18, and is also entered in document 12, for storage in a file on hard drive 22.

Figure 2:
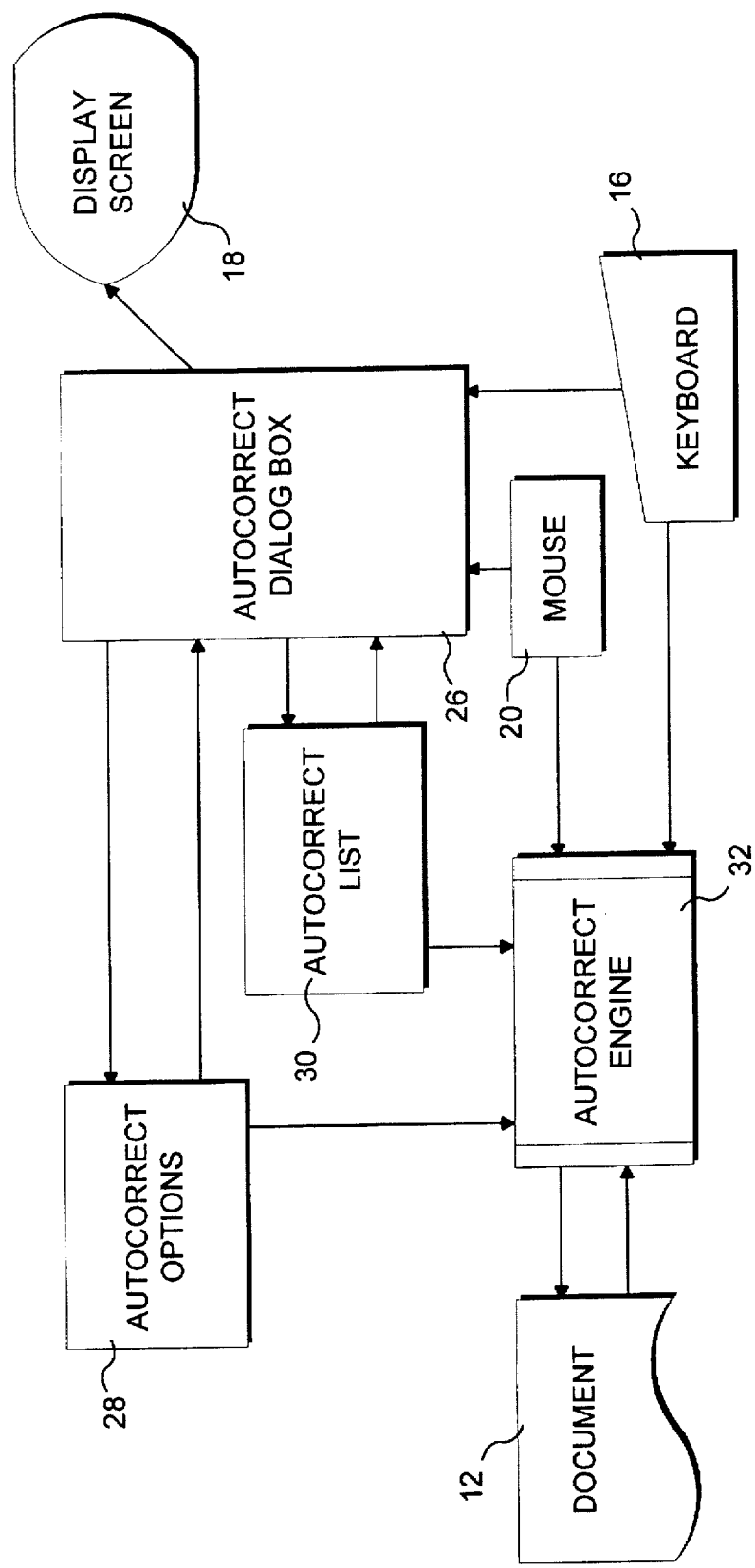
FIG. 2 is a block diagram illustrating the functional components of the autocorrecting function.

As illustrated in the schematic block diagram of FIG. 2, user 14 gains access to the autocorrect function through an autocorrect dialog box 26 in order to set autocorrect options, as indicated in a block 28. Through the autocorrect dialog box, the user can enter new entries in an autocorrect list 30, and also edit or modify entries in the list. An autocorrect engine 32 responds to the autocorrect options set by the user and if the Replacement option is selected, employs the autocorrect list to determine whether characters entered by the user on keyboard 16 correspond to any of the entries within the autocorrect list. If the entry on the keyboard made by the user corresponds to one of the entries in autocorrect list 30, the autocorrect engine replaces the entry by the user with the corresponding list item in document 12.

The autocorrect dialog box is opened on display screen 18 when the user selects "Tools" in the main menu of the word processing program, and "Autocorrect" from the drop-down menu that is then displayed. Alternatively, the user may assign the autocorrect function to a button in a button bar in the word processing screen, so that it can be selected with the cursor using mouse 20. Since WinWord 6 can be customized to change the default items included in each menu and in the toolbar, the user has considerable latitude in modifying the manner in which access to the autocorrect dialog box is achieved.

Figure 6:
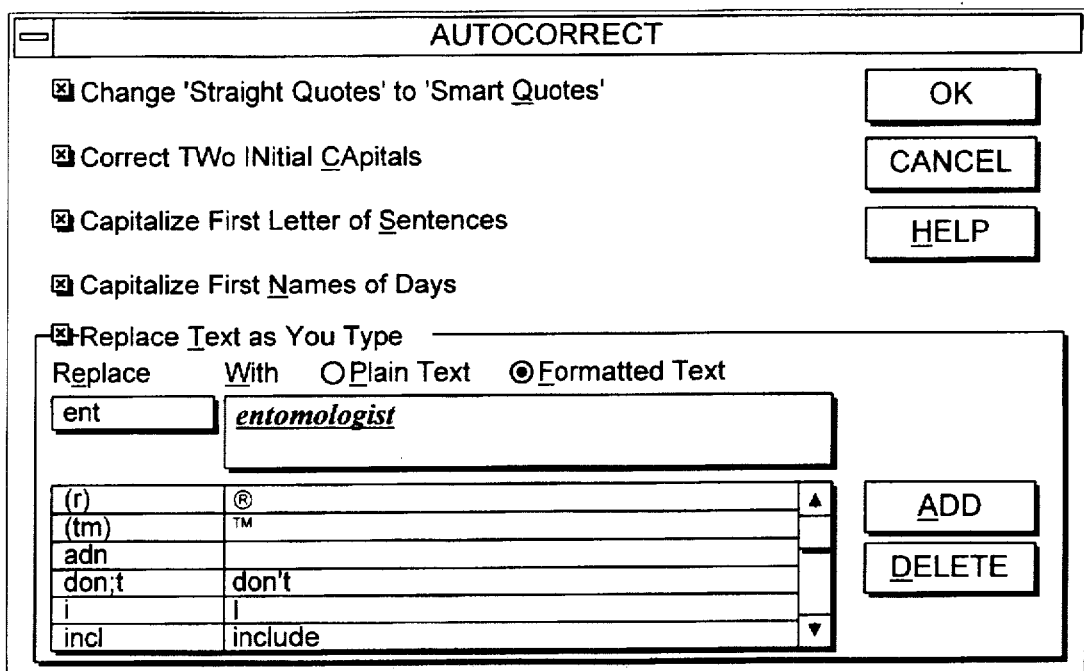
FIG. 6 is an exemplary representation of the dialog box presented to a user to enable the user to select options involved in the autocorrect function and for input and editing of autocorrect entries.

When the autocorrect function is selected, autocorrect dialog box 26 opens on display screen 18, appearing generally as shown in FIG. 6. Five check boxes can be individually selected by the user, using mouse 20 or keyboard 16. When one of the options is selected by clicking on the check box with the mouse or pointing device, an "x" is displayed in the check box to indicate that the user has selected that option. Conversely, if a check box having an "x" is selected, the x in the check box disappears, indicating that the option is no longer selected.

The first option presented to the user is "Change Straight Quotes to Smart Quotes." If this option is selected, either double or single quotes of the straight or conventional type, i.e., " or ', are automatically replaced by corresponding curly quotes, which are different for the opening and closing of a quotation, i.e., "and" or 'and'. WinWord 6 automatically determines whether the straight quotes should be replaced with an opening or closing curly quote, respectively at the beginning or end of a quotation, based upon the context of the quotation within the text, i.e., the first double straight quote appearing in text is replaced with an opening double curly quote, and the next double straight quote that appears in text is replaced with a closing double curly quote. Similarly, the first straight single quote is replaced with an opening single curly quote and the next single straight quote that appears in the text is replaced with a closing single curly quote. WinWord 6 replaces the single straight quote character with a single closing curly quote when used as an apostrophe (e.g., in the word—it's), because in that case, the apostrophe mark appears inside a word.

The second option in the autocorrect dialog box is labeled "Correct TWo INitial CApitals" and is intended to correct a common typing error in which the user fails to release the shift key before the second letter of a word is typed, so that two initial capital letters (or upper case characters) appear in the word. By selecting this option, the user indicates that any word beginning with two upper case letters should be replaced by the same word having a first upper case letter followed by lower case letters. Thus, the word "THey" would be replaced with "They." Furthermore, if a word comprises only two upper case characters commonly used for an abbreviation, such as the abbreviation for Washington state, "WA," the two capital letters are not replaced.

In the third option, the user can enable "Capitalize First Letter of Sentence," thereby insuring that the first letter of the first word in each sentence is capitalized, even if the user forgets to do so.

The fourth option that the user can select is labeled "Capitalize Names of Days." With this option selected, entry of "friday" will be replaced by "Friday." This autocorrection feature can be very helpful, since failure to capitalize days of the week is one of the more common typographical errors. The autocorrection is made regardles of whether the days of the week are entered in singular form or plural form, e.g., "Wednesday" is automatically changed to "Wednesday," and the plural form, "Wednesdays," is automatically changed to "Wednesdays."

The final option is "Replace Text as You Type." Use of the entries in the autocorrect list of the dialog box below this option is conditioned upon the user selecting the option and these entries are not evaluated if the option is not selected. Several default entries provided with WinWord 6 are entered in the list when the program is first installed, and remain in the list unless those entries have been modified or deleted by the user. The default entries provide for replacing "(r)" with "®," "adn" with "and," "don;t" with "don't," "i" with "I," "incl" with "include," "occurence" with "occurrence," "recieve" with "receive," and "teh" with "the." Thus, the default entries illustrate how common typographical and spelling errors can automatically be corrected by selecting this option. The default list provided with WinWord 6 is simply a starting point, since the user can add entries to the list, thereby indicating any one or more characters entered in the box labeled "Replace" that should be automatically replaced with other characters or objects that the user enters in the box labeled "With."

If the text or object in the "With" box (hereinafter referred to as the "definition") is simply plain text, without any special formatting properties, both the Replace entry and its corresponding definition can be simply typed into the adjacent boxes on the autocorrect dialog. Once these two boxes in the dialog are completed, the user selects the "Add" button to create a new addition to the autocorrect list that appears below the two side-by-side boxes in the autocorrect dialog. When a new entry is added to the list, it is automatically inserted in alphabetical order, sorted by the Replace text. Once there are more entries than can be displayed at one time in the list box, WinWord 6 displays a scroll bar to the right of the list, thereby enabling the user to scroll through the entries in the list.

Another and perhaps more convenient way to make an entry in the list is to enter the definition directly into the document, select the replacement text with the keyboard or mouse, and then choose the Autocorrect function from the menu or from the toolbar. The autocorrect function dialog box shown in FIG. 6 then opens, with the definition comprising the replacement text just selected already displayed in the box labeled "With." To complete the entry, the user simply needs to enter the character or characters of text that will be replaced with the definition that was automatically entered in the box labeled "Replace." The user then selects the "Add" button to insert the new entry into the autocorrect list. An advantage of this approach is that larger blocks of text, ranging from a sentence to multiple pages can be selected as an autocorrect list entry definition. Thus, a "boilerplate" paragraph such as used in contracts or other documents that is entered as a definition in the autocorrect list can readily be inserted in a document as a replacement for a short string of characters identified as the Replace text by the user.

Still another provision for adding an entry in the list is provided under the spell check tool dialog box of WinWord 6. When the spell check function is run and has identified a misspelled word, the user can select a button labeled "Add to AutoCorrect List" that is included at the bottom of the spell check dialog box (not shown in the Figures). When this option is selected, the misspelled word and its correct spelling are added as a new entry to the Autocorrect list. The next time that the user types the misspelling, it will be autocorrected to the proper spelling.

Up to 255 characters can be entered as the definition for an autocorrect entry by typing directly in the With text box of the Autocorrect function dialog. If the text comprising a definition is longer than this limit, it should be entered directly in the document and then selected prior to opening the autocorrect dialog box.

Similarly, up to 31 characters can be entered within the Replace box of the dialog. In addition, the characters entered within the Replace text box can be numbers, alpha characters, and/or punctuation characters, but the character string cannot contain any spaces or other whitespace type characters, such as tab characters. Clearly, in most cases where the Replace text is an abbreviation for a longer section of text or an object, it is better to insert relatively few characters in the Replace text box, to minimize the amount of typing required of the user in order to initiate the automatic replacement of the Replace text in the document with the corresponding replacement text or object. By allowing up to 31 characters for the Replace text, WinWord 6 ensures that most words that are commonly misspelled can be entered in the Replace box, so that the misspelled words are automatically replaced with the corresponding definition, which contains the proper spelling of the word.

If the definition that is to replace the characters entered in the "Replace" text box includes formatting or is not plain text, it is added to the autocorrect list using the second method discussed above. Specifically, the definition must first be typed in a document with the appropriate format applied, and then selected prior to the user opening the autocorrect dialog box. Furthermore, to insure that the formatted definition is maintained in the list of entries, the user must select the "Formatted Text" option button (if it is not already automatically selected) rather than the default "Plain Text" option button. These option buttons appear above the With box in which the definition is entered. In this manner, virtually any format can be applied to the text entered as the definition. The definition can be a superscript, a subscript, an underline, a specific point size, a specific font, or any other character format property. An example of formatted text is shown in FIG. 6, where the Replace text "ent" is associated with the definition "entomologist." If the text comprising the definition includes a paragraph mark, the formatting may carry all of the attributes related to paragraph or styles, such as margin size, first line indent, and justification. If special formatting is selected for the definition, the format applied to the definition when it is originally entered into the With box of the autocorrect dialog will apply when the corresponding characters entered into the Replace text box are automatically replaced in the document. The formatting and style attributes associated with the definition entered into the With box are stored by WinWord 6 in a binary file format that supports rich text, when the Formatted Text option button is selected.

The characters entered by the user in the Replace text box can affect recognition of the text typed by the user in the document and determine the capitalization of the definition that replaces that text. An example showing how WinWord 6 handles capitalization is presented in the following table. In this Table, the various capitalized forms of "teh" and corresponding definitions are related to the text typed by the user to show how capitalization is affected.

TABLE 1

| ENTRIES IN AUTOCORRECT LIST | | TYPED BY USER | REPLACEMENT |
|---|---|---|---|
| Replace Box | With Box | IN DOCUMENT | IN DOCUMENT |
| teh | the | teh | the |
| teh | the | Teh | The |
| teh | the | TEH | THE |
| Teh | The | Teh | The |
| Teh | The | TEH | THE |
| TEH | THE | TEH | THE |
| tEH | the | tEH | the |

Any variations in the text entered by the user in the document that are not shown for one of the three cases in Table 1 are not automatically replaced by the autocorrect function.

In general, if the entry entered in the Replace box is all lower case, the capitalization applied to the definition when it replaces the text entered by the user in the document will have the greatest consistency in matching the capitalization of the text typed by the user. Furthermore, if the characters entered in the Replace text box in the dialog have any upper case letters, upper case letters appearing in the definition will be applied to the text that replaces the characters entered by the user, without change. The only exception to this general rule is that if the first word of the definition in the With box is capitalized, WinWord 6 will not alter the case of any of the text that is inserted into the document to replace the text entered by the user. Should any letter of any word other than the first word of the definition be in upper case, that upper case letter will be preserved no matter how the text is entered by the user in the document. If the user wants WinWord 6 to follow the capitalization of the text entered in the Replace box when that text is replaced by the definition in the document, the user should type both the characters in the Replace box and those in the definition entered in the With box in lower case. Conversely, if the user wants WinWord 6 to always insert text with a specific upper case letter, the user should include the upper case letter in the characters stored in the "Replace" text box and type those characters into the document with the same upper case letter used.

To edit or change any entry that has been made in the autocorrect list, the user simply selects the entry from the list box using the mouse cursor, causing WinWord 6 to insert that entry into the two text boxes above the list box. The text in either the Replace or definition text box can then be changed by the user as desired. The "Add" button is then selected to add the revised entry to the list. The old entry can be deleted by selecting the Delete button. If a change is made to the definition, but not to the characters in the Replace box, WinWord 6 will open a message box indicating that "An autocorrect entry for (the characters in the Replace box) already exists. Do you want to redefine it?" Three buttons are included in the message box, including a "Yes" button, a "No" button, and a "Help" button, giving the user the option of replacing an existing entry or not.

There may be times when the autocorrect replacement that is made is inappropriate. For example, if the user has included an entry "tow" and a replacement "two" in the Autocorrect dialog box, that replacement will be carried out if the Replace Text as You Type option has been selected, even though the user actually intended to type the word "tow." WinWord 6 provides two ways in which a replacement can be overridden. The first technique that can be used to override an automatic replacement of text (but not the autocorrect replacement of a straight quote by a curly quote, which is independent of a delimiter being entered) is to simply use the left arrow cursor key to move the insertion point before the delimiter character that follows the replacement, and then to delete the replacement text or object that has been entered by the autocorrect function. If the user again enters the characters that were just replaced and moves the insertion point to the right of the delimiter previously entered, WinWord 6 will not replace those letters, because their entry was not immediately followed by entry of a delimiter character.

The second technique for overriding an autocorrect replacement simply requires that the user select "Undo," either by clicking on the appropriate button in the button bar, using the menu command, or entering Alt-Backspace or Control-Z. Once the Undo command is executed, the replacement that was carried out by the autocorrect function is undone, leaving the original characters entered by the user. For example, if the autocorrect function replaced a double straight quote character with an opening double curly quote, executing Undo restores the double straight quote character. The user is then free to continue entering text. The next time that a double straight quote character is entered, the autocorrect function again replaces the double straight quote character with the opening double curly quote character. Use of the Undo function is perhaps the best way to override the autocorrect function, since simply deleting the text may not delete formatting or style attributes associated with the replacement. Of course it should be apparent that the user can also prevent the replacement simply by turning off that option in the Autocorrect dialog box. Once the replacement function is disabled in this manner, no further replacements of any text entry by the autocorrect function will occur until the feature is again selected.

Although not implemented in WinWord 6, another embodiment of the present invention will permit a user to backspace over the replacement text just produced by the autocorrect function, and then to reenter the characters just replaced without concern for the delimiter character. In this embodiment, the word processing system will recognize the action of the user in backspacing and reentering the same characters as an intentional overriding of the Autocorrect function and as a result, will disable the autocorrect replacement of the text for that instance.

The autocorrect function is not limited to replacing text characters with plain or formatted text. A user can also apply the function to replace predefined text or a character string with graphic objects such as pictures or logos. Generally, any object(s) that can be placed into a document can be identified as the replacement. To add such an entry to the list, the user simply inserts an object such as a picture in a bitmapped or other graphic format into a document, selects the picture or other object with the cursor, and then selects the autocorrect function from the menu or toolbar. When the Autocorrect dialog box opens, the graphic picture or object appears (at least in part) within the definition box. The user can then enter the character or characters in the Replace text box that will be automatically replaced with the graphic object when subsequently entered by the user in a document. Multiple objects or graphic, other objects, and text can thus be inserted as a single replacement item in the dialog box.

In addition to graphic and other pictorial objects, the user can apply the autocorrect function for entering spreadsheets, tables, equations, and any other object produced by other applications that can be inserted into a conventional document. This facility gives the user a relatively easy way to automatically enter such objects into a document where desired, simply by typing the characters corresponding to the object that is to replace those characters. When such an entry is added to the list, the graphic object appears simply as an asterisk within the list, until that entry is selected by the user, causing the object to be partially shown in the definition box of the dialog.

Description of Autocorrect Logic

Figure 3:
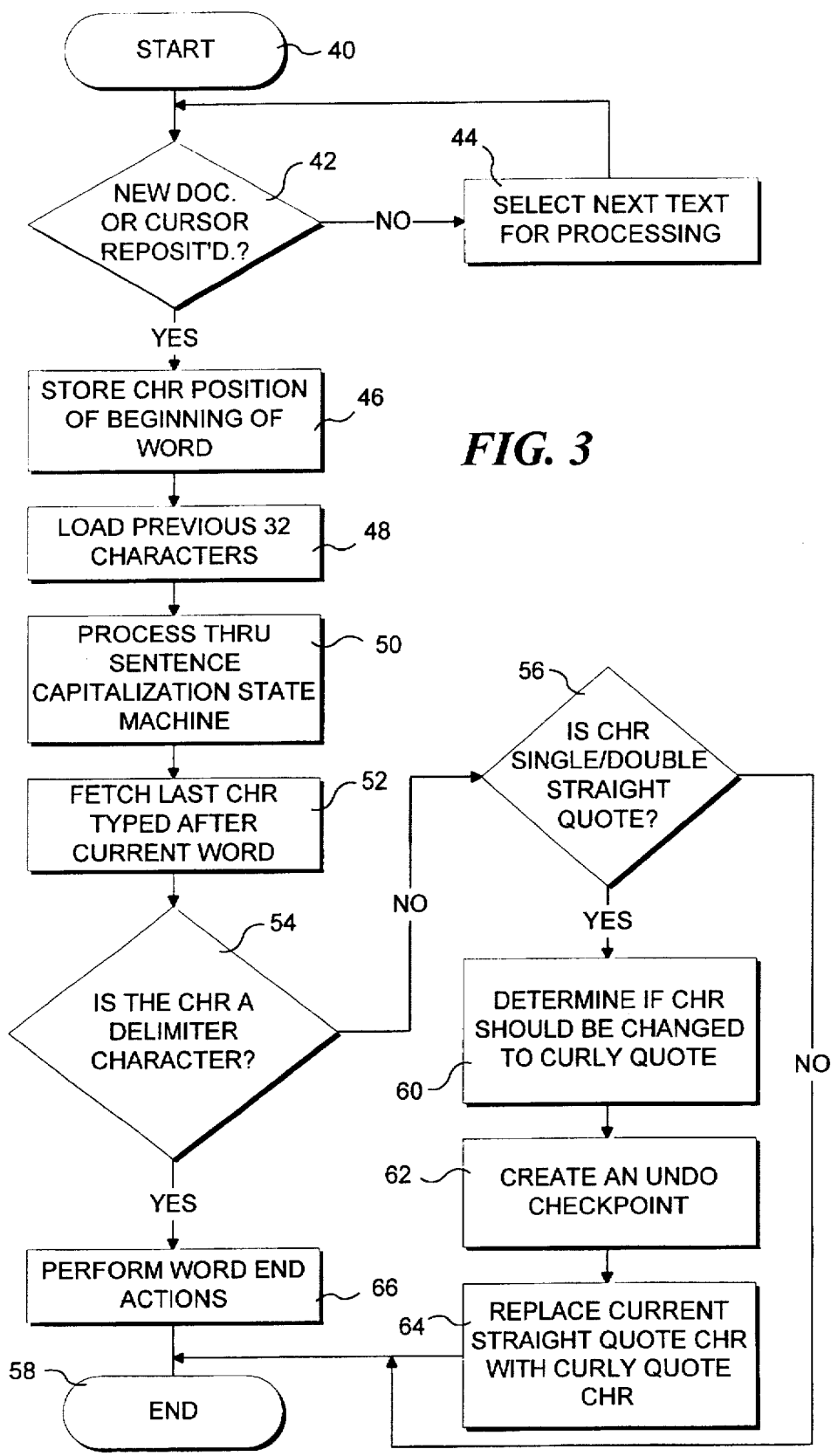
FIG. 3 is a flow chart showing the logical steps used in implementing the autocorrecting function.

Turning now to FIG. 3, a flow chart shows the logical steps implemented by WinWord 6 in carrying out the autocorrect function in the preferred embodiment. Beginning at a start block 40, the logic proceeds to a decision block 42 that determines if the user has opened a new document, or if, in an existing document, the user has repositioned the cursor to a different point. If not, a block 44 provides for selecting the next text that is entered for processing, and then returns to decision block 42. However, if the response to decision block 42 is positive, the word processing system initializes the autocorrect state by locating the beginning character of the word in which the cursor is currently positioned and storing its character position, as noted in a block 46. Next, the system loads the previous 32 characters, in accordance with a block 48. A block 50 provides for processing the 32 characters prior to the present cursor position through a sentence capitalization state machine to determine whether the current word is at the end of a sentence and to identify capital letters in the current word. The sentence capitalization state machine uses the characters of the current word to transition the state machine between its possible states. A word is defined as the text characters and any adjacent punctuation, but does not include whitespaces. The initial state is text. As the characters of words are passed to the capitalization state machine, it may change its current state. For example, if it is passed a sentence ending punctuation character, the capitalization state machine changes to the end punctuation state. By passing the characters of words to the capitalization state machine, the autocorrect function can determine if a particular word is at the end of a sentence, and if so, the autocorrect function can determine that the next word needs to begin with an upper case letter, since it should be the start of another sentence. The sentence capitalization state machine has six states, but only the end sentence punctuation is specifically important to the operation of the autocorrect function, because the function only responds to a change to that state. It will be recalled that the Replace box in the autocorrect dialog is limited to 31 characters, so that processing the previous 32 characters insures that any entry in the Replace dialog box will be recognized.

In a block 52, the word processing system identifies the last character of the current word and thus, identifies the current word. To identify the current word, the system uses the beginning-of-word character position and defines a word as including all of the characters from the beginning of the word up to, but not including, a delimiter. Although it is contemplated that other delimiter characters could be used within the scope of the claims that follow, in the preferred embodiment, a delimiter character is a space, a carriage return, a tab, and any other whitespace character. Since punctuation such as periods or commas are not considered a delimiter in the preferred embodiment, the current word that is identified may include such punctuation.

A decision block 54 determines if the last character typed after the current word is a delimiter character. If not, the logic proceeds to a decision block 56. Decision block 56 determines if the character is a single or double straight quote. If not, the logic proceeds to an end block 58. However, if the last character entered is a single or double straight quote, the logic proceeds to a block 60 to determine if the character should be changed to a corresponding curly quote. Replacement of a single or double straight quote with a single or double curly quote depends upon whether the user has selected that option in the Autocorrect option dialog. The curly quote that is entered will be an opening quote if the current character is at the beginning of the document, or if the previous character is an opening parentheses "(", an opening bracket "{", an opening brace "|", an "=" character, a ">" character, or a "<" character, or if the previous character is a single opening quote and the current character is not a single straight quote, or if the previous character is an double opening quote and the current character is not a double straight quote, or if the previous character is a whitespace. Otherwise, the curly quote will be of the closing quote form. After decision block 60, the logic creates an "Undo" checkpoint in a block 62. The Undo checkpoint insures that if the user later executes the Undo command, the curly quote will be replaced with the straight quote originally entered by the user. Thereafter, the logic proceeds to a block 64 wherein the current straight quote character is replaced with the appropriate curly quote character. Thereafter, the logic proceeds to end block 58.

Referring back to decision block 54, if the last character typed after the current word is a delimiter, the word processing system performs appropriate word end actions, in accordance with a block 66. Details of the steps carried out in performing word end actions are shown in FIG. 4.

Figure 4:
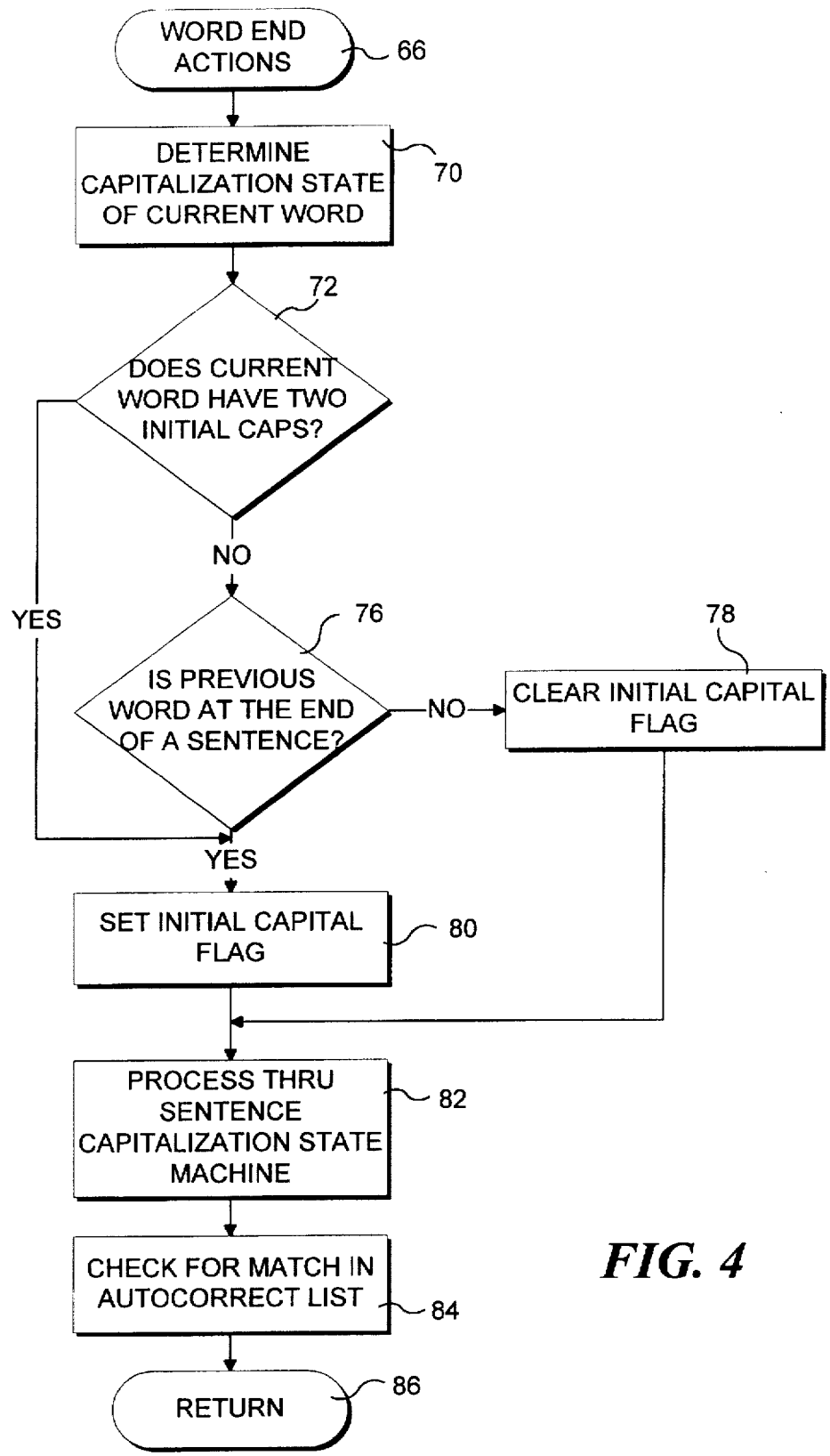
FIG. 4 is a flow chart illustrating the detailed steps carried out when performing word end actions, which is one of the steps in FIG. 3.

Referring now to FIG. 4, a block 70 determines the capitalization state of the current word using the sentence capitalization state machine. Based upon the state information returned by the capitalization state machine, decision block 72 determines if the current word has two initial capitalized letters, e.g., "WHere." If so, the logic bypasses a decision block 76 that determines if the previous word is at the end of a sentence. Otherwise, the logic proceeds to decision block 76. The determination at decision block 76 is made by the sentence capitalization state machine. If a negative response is returned to the inquiry, a block 78 clears an initial capitalization flag and proceeds to a block 82. However, if the response to decision block 76 is positive, a block 80 sets the initial capitalization flag.

Next, block 82 runs the current word through the sentence capitalization state machine to determine if the current word is at the end of a sentence, i.e., determines if the last character of the current word is an end-of-sentence punctuation character. The information determined by this inquiry is used in decision block 76 for the next word that is processed.

Assuming that the user has selected the option to replace text as it is entered, a block 84 checks for a match of the current word in the autocorrect list. Details of the steps implemented in checking for such a match are shown in FIG. 5.

Figure 5:
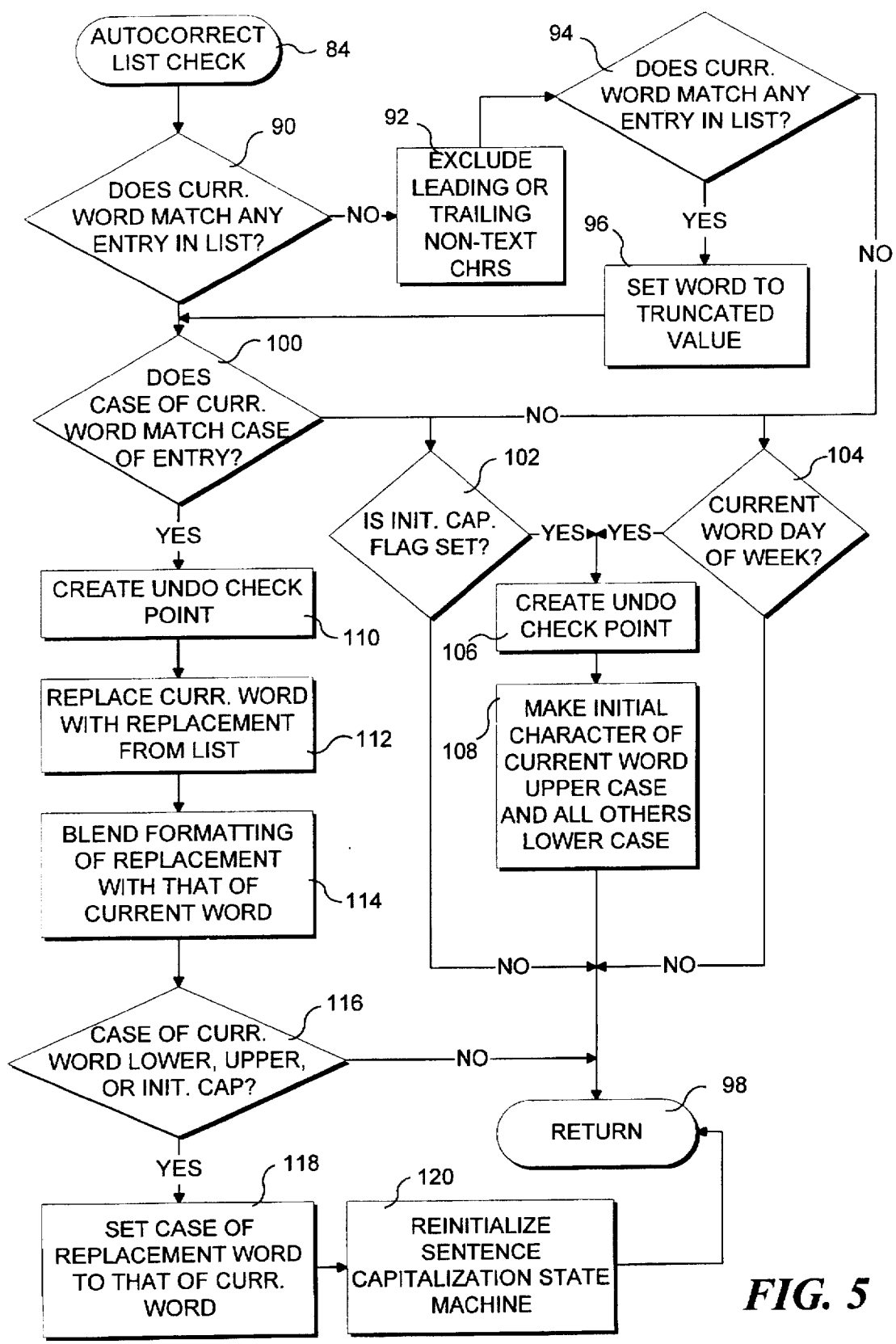
FIG. 5 is a flow chart showing the detailed steps implemented in checking for a match in the autocorrect list, which is one of the steps of FIG. 4.

Turning to FIG. 5, this option is implemented starting with a decision block 90 that determines if a current word match exists for any entry in the list, i.e., the same as any of the Replace portion of the entries in the autocorrect list. This test is satisfied if the characters of the words match the characters in the list, regardless of case. Actually, two chances are provided to determine if the word matches one of the Replace entries in the autocorrect list. If there is no match to the initial check made in decision block 90, a block 92 excludes leading or trailing non-text characters, such as punctuation, in the current word. Then, a decision block 94 again determines if the current word (minus the leading or trailing non-text characters) matches any entry in the autocorrect list. If so, a block 96 sets the current word to the truncated form derived by excluding the leading or trailing non-text characters.

The second test for a match to an entry in the autocorrect list that is carried out in decision block 94 is satisfied according to the following set of rules. These rules are best understood by reference to a specific example. Specifically, if "teh" is entered in the autocorrect list as an entry to be replaced, then "teh," "Teh," and "TEH" will pass the test in decision block 94. If "Teh" is the entry in the Replace side of the autocorrect list, then "Teh," and "TEH" will pass the test. If "TEH" is in the Replace portion of an entry in the autocorrect list, then only "TEH" will pass the test. Finally, if the word in the Replace portion of the autocorrect list is not all lower case letters, all upper case letters, or does not have an initial upper case letter, then only a word with the identical state will pass the test, e.g., only "tEh" will match "tEh." This example is simply a restatement of the rules that were discussed above in connection with Table 1. The second portion of the test that follows an affirmative response to decision block 90 or an affirmative response to decision block 94 proceeds through block 96 is indicated in a decision block 100. A negative response to decision block 94 leads to decision blocks 102 and 104, which are discussed below.

Continuing in FIG. 5, if the current word (or truncated value of the current word) matches an entry in the autocorrect list, and if the case of the current word matches the case of the entry according to the predefined rules discussed above, a block 110 creates an Undo checkpoint to enable the user to override the subsequent replacement. A block 112 then replaces the current word with the definition from the autocorrect list.

Next, a block 114 provides for blending the formatting of the definition with that of the previous current word (originally entered by the user). If there is any conflict between an attribute of the formatting provided for the replacement in the autocorrect list and that of the text at the insertion point, then the value of the format attribute from the autocorrect list entry is applied to the replacement.

A decision block 116 determines if the case of the characters comprising the previous current word were lower case, upper case, or had only an initial upper case letter. Inherent in this test is also a determination of whether the case of the replacement text from the autocorrect list is one of these three options and of whether it is different than the case of the previous current word. If so, a block 118 sets the case of all characters in the replacement word to that of the previous current word that was originally entered into the document by the user. Otherwise, at a return block 98, the logic returns to the flow chart in FIG. 4.

Following block 118 in FIG. 5, a block 120 reinitializes the sentence capitalization state machine, since the word replacement may have changed the state of the previous current word that was entered by the user in the document. For example, if the previous current word was at the end of a sentence, but is replaced with text that concludes the original sentence and adds words that are at the beginning of the next sentence, the sentence state will have changed. Thereafter, the logic proceeds to return block 98 and then to the flow chart of FIG. 4.

Referring back to decision block 100 and to decision block 94 in FIG. 5, if the case of the current word does not match the case of a corresponding entry in the autocorrect list or if the current word (after excluding leading or trailing non-text characters) does not match any entry in the list, two further determinations are evaluated in parallel. In a decision block 102, the word processing system determines if the initial cap flag is set. If not, the logic proceeds to return block 98. However, if the initial cap flag is set, indicating that the current word starts with an upper case letter, the logic proceeds to a block 106 to create an Undo checkpoint. Similarly, a decision block 104 determines if the current word is a day of the week (assuming that the option to replace non-capitalized days of the week with words having an initial capitalized letter has been selected by the user). If not, the logic again proceeds to return block 98. Otherwise, affirmative responses from either decision block 102 or decision block 104 lead to a block 106 that creates an Undo checkpoint. In a block 108, the word processing system makes the initial character of the current word upper case. Thereafter, the logic again executes return block 98 and returns to the flow chart in FIG. 4.

Referring again to FIG. 4, following the check for a match in the autocorrect list made in block 84, the logic proceeds to a return block 86, leading back to the flow chart of FIG. 3, at end block 58. Thereafter, the autocorrect function terminates at an end block 58.

The first preferred embodiment which is implemented in WinWord 6 faithfully makes the autocorrection changes covered under the option selected by the user, using the entries and replacements provided by the user in the autocorrect list. However, there are times when the changes caused by autocorrecting text entered by the user are undesired and must be undone. Clearly, it would be desirable to provide intelligence to the word processing program so as to minimize the need for the user to override the autocorrect changes made by the word processing system. A second embodiment provides the means to the word processing system to make a more "intelligent decision" about when at least some of the autocorrect changes should be made.

The technique employed in this second embodiment to decide when a user has either intentionally entered a word beginning with two upper case letters, or intentionally entered a word in which letters are transposed relative to a word in the autocorrect list is based upon observations made of how typing errors arise when text is entered by a touch typist. Unintended double upper case letters and transposed letters occur due to slightly mistimed coordination between the right and left hands of the user, which can result because of different flexibilities of the fingers depressing the respective keys on the keyboard. For example, when entering the word "the," the left index finger moves to strike the letter "t," positioning the left middle finger over the letter "e" so that it responds more rapidly than the right index finger, which must be moved from its rest position on the letter "j" to strike the letter "h." As a result, the user enters the transposed letters "eh" yielding "teh" instead of the desired word "the." If the timing for entry of the three letters comprising the incorrect word "teh" is monitored, it will be observed that the letters "e" and "h" were typed almost simultaneously—certainly with less time duration between the key presses than most other adjacent two letters entered by the user previously in a line of text. Thus, the time interval between two characters in a word can be used as an indicator of the probability that an error has occurred as the characters were typed, due to transposition. Similarly, when the user types a word that includes two upper case letters, an error is usually associated with an extremely short interval between the key depression to enter the second letter and release of the shift key. To avoid autocorrecting text when the user intended to enter two upper case letters in a word, as is sometimes the case when entering abbreviations, the word processing system can respond to the timing between the second letter and release of the shift key.

To implement this second embodiment, the word processing system makes use of the message queue (or display buffer) that is commonly employed by applications that accept text entered by a user for display in a window in the application. Accordingly, it should be noted that this embodiment is not limited to word processing systems, but can also be employed more generally for use in spreadsheet programs, database programs, and virtually any other application program that accepts text entered by a user for display in a window.

When a keyboard event occurs, the event is transmitted into a message that is entered into the message queue for the application. The application subsequently retrieves and delivers the message to the proper windows by executing a block of code known as the "message loop." The window procedure for the application program that receives the message then processes it for display within the window. Thus, when a user presses down on any key of the keyboard, the procedure for the window receives a KeyDown message. Subsequently, when the user releases the key, the procedure for the window receives a KeyUp message. Both the KeyDown and KeyUp messages include a code number indicating the key that was pressed or released. Similarly, the Shift key, Alt key, and Control key each have their own key codes, as do all other keys on the keyboard.

Figure 7:
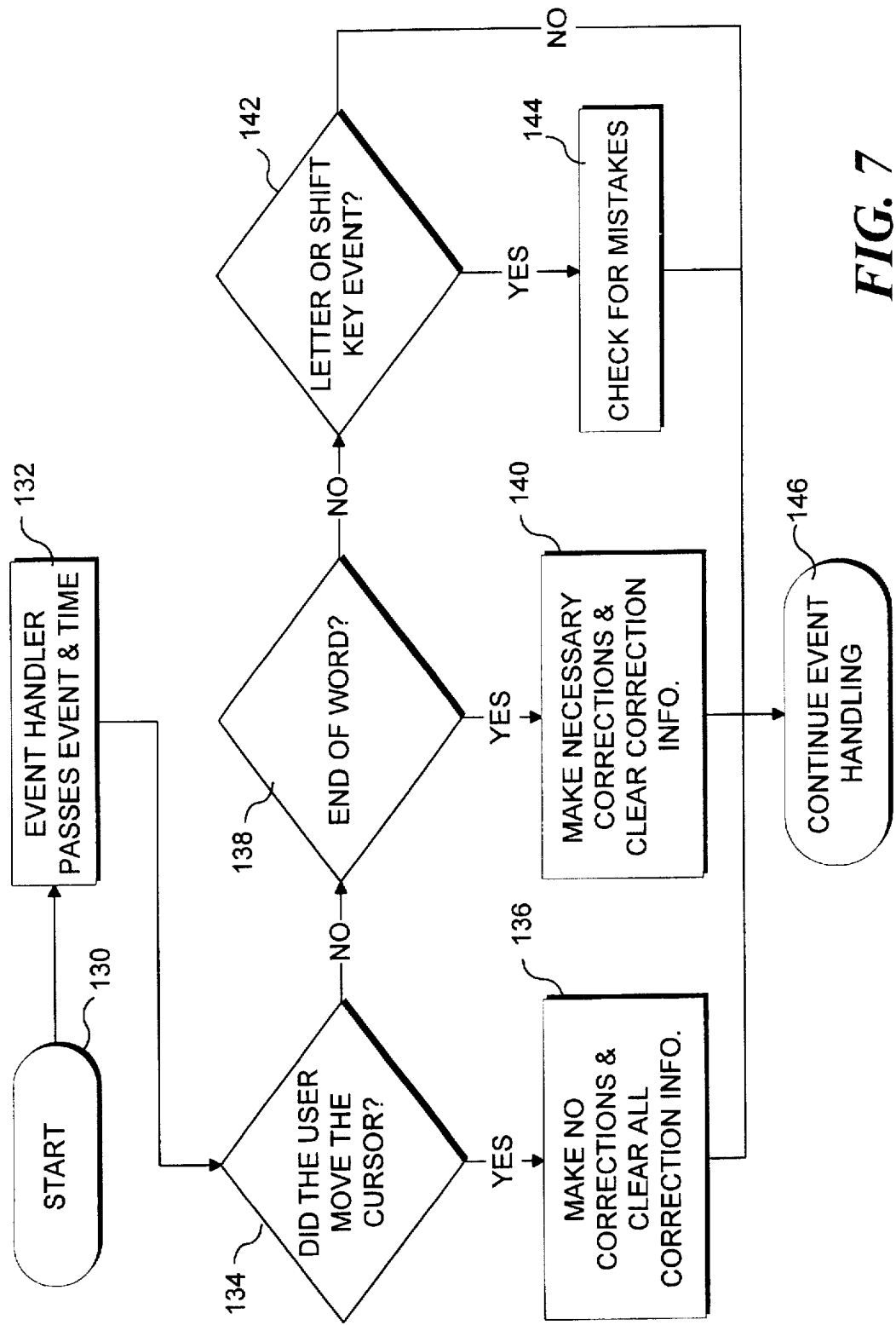
FIG. 7 is a flow chart showing the steps implemented in an alternative embodiment of the autocorrect function in which the typing speed of the user is monitored to determine whether an autocorrect change will be made.

FIG. 7 shows the steps implemented in carrying out the second embodiment of the invention. Beginning at a start block 130, the logic proceeds to a block 132 in which the event handling procedure is implemented. In accordance with this step, the event handler monitoring keyboard 16 and mouse 20 detects key presses and movements of the cursor entered by the user, passing the code number for the event and the time at which the event occurred to the application program. Timing for the event is obtained from the operating system clock signal. In a decision block 134, the program determines if the user has moved the cursor. Movement of the cursor (a special symbol on display screen 18) is accomplished by movement of mouse 20 or by use of the cursor control keys on keyboard 16, as is well known to computer users. A mouse click within the text window, depression of the arrow key, Page Up key, Page Down key, End key, Home key, or other related keys or commands may be responsible for moving the cursor to a different location within the window on display screen 18. The program does not track each letter entered by the user or attempt to look for the end of the word when the cursor is moved. A user may move the cursor before completing the current word and may return to the word to finish it. Provision is made for adding characters to a word previously started, at a later time, as noted below. Once the cursor has been moved, a block 136 insures, that no corrections are made to the portion of the word entered just before the cursor was moved and clears all correction information so that any memory that was being used to track events for the current word is freed. Control is returned to the program's main event handler in a block 146, so that the program can respond to any subsequent keyboard or mouse events.

If the user did not move the cursor, the logic proceeds to a decision block 138 to determine whether the end of word has been reached. As previously noted above, any delimiter character entered after an alpha character in a word serves as an indication that the character sequentially entered just before the delimiter was the last character of the current word. Each of these delimiter characters have their own key codes that are indicated by KeyDown events that are passed to the event handler. If the word is completed, a block 140 provides for making the necessary corrections, followed by clearing of the correction information from memory. The steps carried out in block 140 are generally consistent with those in FIG. 4 for the first embodiment, since they correspond to the word end actions implemented in the first embodiment. Referring to FIG. 4, the only differences between the two embodiments relate to deletion in the second embodiment of decision block 72 and its related results, since in the second embodiment, it is not necessary to determine if the current word has two initial upper case letters. The second embodiment supports all of the autocorrect features of the first embodiment, such as capitalizing the first word of a sentence, names of days, etc. After block 140, the logic proceeds to block 146, to continue event handling.

Assuming that the user has not just typed the last character of a word, the logic proceeds to a decision block 142 that determines if the last keyboard event was the entry of a letter or whether the shift key was pressed down or released. It should be noted that for keyboards using non-English alphabets, other modifier keys in addition to the Shift key can be monitored. Decision block 142 is thus intended to encompass any other single key keyboard modifier that is used in typing text in the same manner that the Shift key is. The program can determine whether a letter was entered by the user by insuring that the KeyDown key code occurs between the code for "a" (or its equivalent in the foreign alphabet) and the key code for "z" (or the foreign alphabet equivalent), or between their corresponding upper case equivalents. The program determines if the Shift key was depressed or released by looking for the specific Shift key code in the event handler message queue. If any other type of event occurred, this procedure ignores it and passes control back to the program's main event handler, as indicated in block 146. However, if either a letter key was depressed or the Shift key was depressed or released, the program proceeds to a block 144 to check for mistakes.

Figure 8:
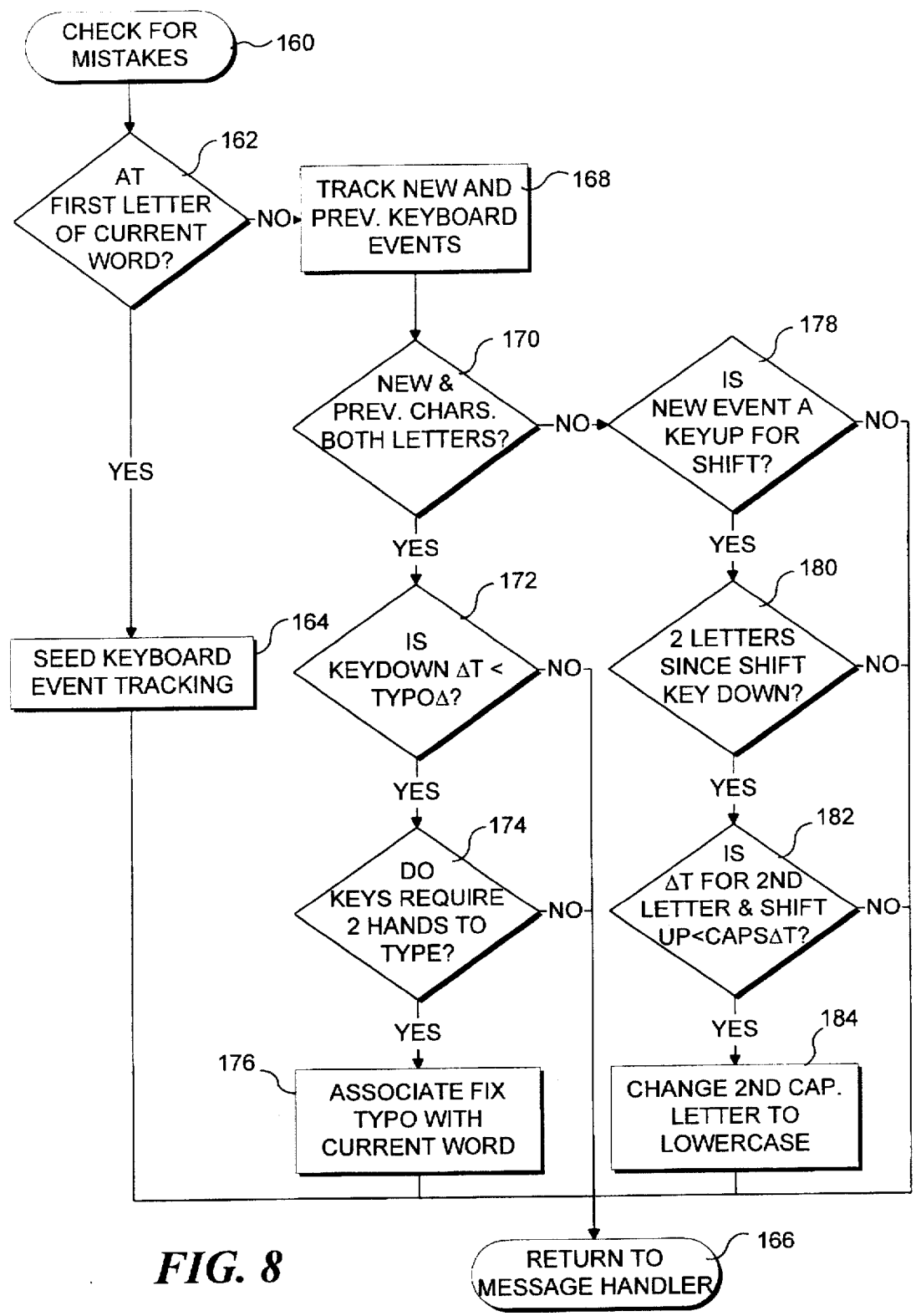
FIG. 8 is a flow chart showing the steps that are implemented to check for mistakes in the entry made by a user.

Referring to FIG. 8, details of the procedure used for checking for mistakes are shown, beginning at a block 160. A flag is used to determine if the keyboard event corresponds to the first letter KeyDown event for the current word, as provided in a decision block 162. In other words, decision block 162 determines if the user has started to enter a new word, or is simply continuing to type letters for a word that was previously started. The flag is set to False when the program first begins and also at block 136 (in FIG. 7) after the user has moved the cursor. In addition, the flag is set to False in block 140, after the end of a word has been detected. Conversely, the flag is set to True in a block 164 after a letter KeyDown event has been detected and if the flag was previously False. In addition, block 164 provides for setting variables that will be used to compare the current keyboard event and the previous keyboard event for the current word. After these variables and the first letter flag are set, the logic proceeds to a block 166, which provides for returning to the message handler to continue event handling, as described above in connection with FIG. 7.

After the first letter of the current word has been entered, subsequent letter entries or Shift key events cause the program to proceed from decision block 162 to a block 168, which carries out tracking of the previous key event and time, as well as the current key event and time. The current keyboard event becomes the previous keyboard event as soon as the next keyboard event occurs, and the times at which the previous keyboard event and the current event occurred are maintained for subsequent comparison. The program also tracks the number of letters typed after a Shift KeyDown, but before a Shift KeyUp event occurs. This information is used below in the flow chart.

A decision block 170 determines if both the new current and previous current keyboard events correspond to entry of letters by the user. If so, a decision block 172 determines if the KeyDown $\Delta T$ is less than a predefined Typo$\Delta$. Decision block 172 thus determines if the time between the current KeyDown event and the last KeyDown event is less than the variable Typo$\Delta$, thereby indicating that the user may have transposed two letters. In the preferred embodiment, the value of Typo$\Delta$ is set to 0.08 seconds. Those skilled in the art will appreciate that the choice of the time interval for Typo$\Delta$ is not intended to in any way limit the present invention; instead, any value that is empirically found to provide the desired result can be substituted for the variable. It may be appropriate to provide the user with control over the value of Typo$\Delta$ by including a dialog box with a slider control, allowing the user to set the value within arbitrary limits. Clearly, the value should be set to a smaller time interval for a touch typist who types at a relatively higher speed than for a touch typist who types more slowly. Further, for a given user, experience may show that the value of Typo$\Delta$ should be adjusted to minimize mistakes in the autocorrect function decision regarding the likelihood that transposed letters have been typed.

If the response to decision block 172 is negative, the logic returns to the message handler in FIG. 7, as noted in block 166. Conversely, if the user has entered two letters sufficiently close in time so that the interval between the KeyDown response for the two letters is less than Typo$\Delta$, the logic proceeds to a decision block 174, which determines if the two keys that were entered are normally typed using both the left and the right hands. The primary purpose of decision block 174 is to refine the decision process in determining whether the user has transposed two letters in the current word. Research has shown that transpositions occur most frequently from coordination mistakes between the right and left hands, as explained above. The function of decision block 174 is to test whether the two letters that were typed were entered using both the left and the right hands, which if so, would increase the probability that a transposition error had occurred. To carry out the inquiry of decision block 174, the program uses a function, which for a given letter KeyDown event code, will indicate whether the letter typed appears on the left-hand portion of the keyboard. To carry out this inquiry, a table is consulted that includes the codes for the keys normally typed by the left hand when touch typing. This table can be modified for non-English keyboards or for non-standard keyboard layouts, such as the Dvorak keyboard configuration. A transposition of the last two letters entered is more likely if the inquiry in decision block 174 determines that only one of the last two letters was entered using the left-hand portion of the keyboard. A negative response to decision block 174 causes the program logic to proceed to block 166, thereby returning to FIG. 7.

A positive response to the inquiry in decision block 174 leads to a block 176, in which the program associates a Fix Typo flag with the current word, and keeps track of the two letters that are likely transposed. It should be noted that the second embodiment of the present invention has the capability to flag multiple pairs of letters that are likely transposed within a single word, unlike the first embodiment.

Transposition typos and other errors detected in the second embodiment are not corrected until the end of a word is reached. The actual correction occurs in block 140 of FIG. 7. It should be noted that if the Fix Typo flag has been set, in block 140, the program can check to determine if the word as typed is found in a spell check list, or if it appears in the Autocorrect dialog list of entries, in determining whether to autocorrect the likely transposition. Alternatively, in block 140, the program can simply alert the user that a possible transposition error may have occurred in the current word, for example, by causing the word to blink or by changing the color (or intensity) of the word on the display screen. After setting the Fix Typo flag for the current word in block 176, the logic again returns to the message handler, as provided in block 166.

Referring back to decision block 170, if the current and previous keyboard events do not both correspond to entry of letters, one of the keyboard events may have been a Shift event. Accordingly, the logic proceeds to a decision block 178 to begin checking for Shift errors, which may have led to multiple adjacent letters incorrectly being entered in upper case. Such errors occur because the user holds down the Shift key too long (again resulting from a coordination problem between both hands), accidentally obtaining two upper case letters instead of a single upper case letter. In decision block 178, the program determines if the most recent keyboard event is a KeyUp event for the Shift key. To carry out this determination, the program compares the code for the KeyUp event with the Shift key code. If the last event is not a KeyUp event for the Shift key, control is returned back to the program's main message handler, as provided in block 166. However, if the last keyboard event was the KeyUp for the Shift key, the logic proceeds to a decision block 180 to determine if there were two letters typed since the Shift key was initially depressed, i.e., since the KeyDown for the Shift key occurred, based upon the information that was tracked in block 168. It will be recalled that in block 168 the previous and current keyboard events and their corresponding times, and the number of letter keys depressed between the depression and release of the Shift key were tracked. If the response to decision block 180 is negative, the logic returns to block 166. Conversely, a positive response leads to a decision block 182, which determines if the time between the Shift KeyUp event and the letter KeyDown event that occurred immediately before it is less than a variable Caps$\Delta$T. In other words, the $\Delta$T between the second letter typed by the user and the Shift KeyUp event is determined and compared to the variable Caps$\Delta$T. Caps$\Delta$T is preferably set to 0.08, by way of example. However, it can be set to any other value that produces the desired result. Again, this value may be set by the user within an arbitrary range, based upon the user's experience and touch typing speed. The inquiry carried out in decision block 182 simply determines if it is more likely that the second letter which is in upper case was in error, based upon the time interval between the entry of the second letter and the release of the Shift key. A negative response to decision block 182 again lead back to block 166. However, a positive response to the inquiry in decision block 182 leads to a block 184 that changes the second capital letter to lower case, thereby correcting a perceived error in the entry made by the user. It should be noted that this correction occurs immediately, without waiting for the user to reach the end of the word.

Two upper case letters entered within the interior of a word, as opposed to the first and second letter of the word will also be changed in block 184, if the conditions just described are met. By fine tuning the selection of the Caps$\Delta$T variable, the second embodiment of the autocorrect function can be made to correct erroneous entries such as "PowerPOint" to the intended entry "PowerPoint," which the first embodiment provided in WinWord 6 is incapable of accomplishing. Furthermore, in instances where the user intends to enter two adjacent capital letters within a word, because the condition in decision block 182 are not met, the program will likely not autocorrect the two upper case letters. The second embodiment thus avoids improper autocorrection of an intended entry of two adjacent upper case letters, as sometimes occur when abbreviations are entered, such as "CD's" (the abbreviation for compact disks).

Although the present invention has been described in connection with the preferred form of practicing it, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A method for automatically replacing an entry made by a user in a computer display with a replacement, said method comprising the steps of:
   (a) enabling the user to indicate the entry that will be automatically replaced and storing said indication;
   (b) enabling the user to identify the replacement that will automatically replace the entry and storing the identification of the replacement in relationship to said entry;
   (c) scanning characters entered by the user to detect if:
      (i) the user has entered characters comprising the entry; and
      (ii) a delimiter character was entered after the characters comprising the entry; and if so,
   (d) automatically replacing said entry with the replacement.

2. The method of claim 1, wherein the replacement comprises a plurality of characters that are not limited to a single word.

3. The method of claim 1, wherein the replacement comprises a graphic representation.

4. The method of claim 1, further comprising the steps of storing a plurality of entries in a list, each entry in said list corresponding to a different replacement that automatically replaces said entry when said entry is detected in accordance with steps (c)(i) and (c)(ii).

5. The method of claim 1, wherein the entry comprises a first and a second character in any word that are both upper case and are followed by at least one lower case character, said replacement comprising corresponding first and second characters, with the second character being in lower case, for use in correcting typographical errors wherein any word is mistakenly entered by the user with two initial upper case characters.

6. The method of claim 1, further comprising the steps of determining a rate at which the user enters characters; and as a function of said rate, determining whether to replace the entry with the replacement.

7. The method of claim 1, wherein the entry comprises a lower case character as an initial character of a first word in a sentence, said replacement comprising a corresponding upper case character for the initial character of the first word.

8. The method of claim 1, wherein the replacement is stored in a binary file format that supports a rich text format and includes any object, formatting and style data, which are applied to the replacement.

9. The method of claim 1, wherein the entry comprises a word, and wherein a case used for characters comprising said word at least in part determine the case of the characters comprising the replacement.

10. The method of claim 1, further comprising the step of disabling step (d) in a current instance to prevent said entry from again being replaced with the replacement if the user backspaces over the replacement and reenters the entry, thereby enabling the user to override the automatic replacement for said current instance.

11. A method for automatically replacing at least one specified character with at least one predefined replacement character in the text of a word processing document, comprising the steps of:
 (a) locating an initial character in a current word in which a cursor is positioned and storing a character position for the initial character; and
 (b) determining if the current word is followed by a delimiter character, and if so:
  (i) comparing each character comprising the current word with said at least one predefined character to determine if a match exists; and
  (ii) if said match exists, automatically replacing said at least one predefined character with said at least one predefined replacement character.

12. The method of claim 11, wherein said at least one predefined character is an initial lower case character of a day of a week, and wherein said at least one predefined replacement character comprises a corresponding initial upper case character for the day of the week.

13. The method of claim 11, wherein said at least one predefined character comprises a second character of any current word that is upper case, is preceded by an upper case letter, and is followed by any lower case characters that further comprise the current word, and wherein said at least one predefined replacement character comprises a corresponding second character of the current word that is lower case.

14. The method of claim 11, wherein said at least one predefined character comprises any initial lower case character of any current word beginning a sentence, and wherein said at least one replacement character comprises a corresponding initial upper case character of said current word.

15. The method of claim 11, further comprising the steps of storing a plurality of predefined character expressions, each of said predefined character expressions corresponding to a different predefined replacement expression; and automatically replacing any of said predefined character expressions entered by a user with the corresponding predefined replacement expression.

16. The method of claim 11, wherein said at least one predefined replacement character includes formatting parameters that determine its form and style.

17. The method of claim 11, wherein said at least one predefined replacement character comprises a graphic figure.

18. The method of claim 11, wherein said at least one predefined replacement character includes formatting stored in a binary file format that supports a rich text format and includes any object, formatting and style data which are applied to the replacement character.

19. The method of claim 11, wherein a case associated with said at least one predefined character, a position of the current word in a sentence, and the case of at least one character of the current word determine the case of said at least one predefined replacement character in the document.

20. The method of claim 11, further comprising the steps of:
 determining whether a user has entered a command to undo the replacement of said current word with said at least one predefined replacement character, and if so:
  (a) replacing said at least one predefined replacement character with said current word; and
  (b) positioning an entry point after the delimiter character, thereby enabling the user to override the replacement of the current word.

21. A method for automatically correcting an error in text entered in a word processing document in real time, as said document is being created, comprising the steps of:
 determining if a word of the text just entered in the document includes a first and a second initial character that are upper case and have been entered at a rate that exceeds a predefined value, followed by at least a third character that is lower case; and if so,
 automatically replacing the second initial character of the word that is upper case with a corresponding lower case character as the word processing document is being created.

22. The method of claim 21, further comprising the step of providing a user with an option to disable the automatic replacement of the second initial character of any word with the corresponding lower case character.

23. A word processing system that selectively automatically replaces an entry made by a user in a word processing document with a replacement, comprising:
 (a) a computer that includes:
  (i) a central processing unit;
  (ii) a memory in which program instructions are stored for controlling the central processing unit, causing the computer to function as a word processing system;
  (iii) a display that is coupled to the central processing unit, for displaying text entered by the user into the word processing system;
  (iv) a user interface that is coupled to the central processing unit to enable text and commands to be entered into the word processing system to create a document; and
  (v) a non-volatile storage unit in which the document is stored; and
 (b) said program instructions causing the computer to:
  (i) enable the user to indicate the entry that will be automatically replaced and thereafter, storing said indication;
  (ii) enable the user to identify the replacement that will automatically replace the entry and thereafter, storing the identification of the replacement in relationship to said entry; and
  (iii) scan characters typed by the user to detect if:
   (1) the user has typed the characters comprising the entry, and
   (2) the user has typed a delimiter character after the entry; and if so,
  (iv) to automatically replace said entry with the replacement.

24. The word processing system of claim 23, wherein the replacement comprises a plurality of characters that are not limited to a single word.

25. The word processing system of claim 23, wherein the replacement comprises a graphic representation.

26. The word processing system of claim 23, wherein said program instructions cause the central processing unit to store a plurality of entries in a list, each entry in said list corresponding to a different replacement that automatically replaces the entry when the delimiter character is typed and the entry is detected in the characters typed by the user immediately before the delimiter character.

27. The word processing system of claim 23, wherein the entry comprises a first and a second character in any word that are both upper case and are followed by at least one lower case character, said replacement comprising a corresponding first and second character, with the second character being in lower case, for correcting a typographical error in which a word is mistakenly entered by the user with two initial upper case characters.

28. The word processing system of claim 23, wherein the entry comprises a lower case character as an initial character of a first word in a sentence, said replacement comprising a corresponding upper case character for the initial character of the first word.

29. The word processing system of claim 23, wherein the replacement is stored in a binary file format that supports a rich text format and includes any object, formatting, and style data, which are applied to the replacement.

30. The word processing system of claim 23, wherein the entry comprises a word, and wherein a case used for characters comprising said word at least in part determines the case of the characters comprising the replacement that are inserted into the document.

31. A method for automatically replacing an entry made by a user in a computer display with a replacement, said method comprising the steps of:

(a) determining a time interval between a plurality of predefined keyboard events as a user types on a computer keyboard; and (b) automatically replacing at least one character of a current word with the replacement if said time interval between said predefined keyboard events occurring during typing of the current word is less than a predetermined value, said predetermined value having been selected as being indicative that the user has typed a typographical error, said replacement being entered to correct the typographical error.

32. The method of claim 31, wherein the current word typed by the user includes two adjacent upper case characters, and the replacement changes a second of the two upper case characters to be a corresponding lower case character.

33. The method of claim 32, wherein the keyboard events include, in order, a shift key depression, a first key depression, a second key depression, and a shift key release, said second upper case character being changed to the corresponding lower case character when the shift key release occurs less than a predetermined interval after the second key depression.

34. The method of claim 31, wherein the current word typed by the user includes two characters that are transposed, said replacement reversing a sequential order of the two characters that were transposed to provide a correct order of said characters.

35. The method of claim 34, further comprising the step of providing a lookup table in which a plurality of entries corresponding to typographical errors are stored, each entry being associated with a corresponding replacement in which transposed characters in the entry are corrected.

36. The method of claim 34, further comprising the step of determining a likelihood that the current word includes a transposition error, said likelihood being a function of a time between a first key depression and a second key depression.

37. The method of claim 36, wherein the likelihood of a transposition error having occurred in the current word is greater if the time between the first and the second key depressions is less than a predetermined value.

38. The method of claim of 37, further comprising the step of enabling the user to change the predetermined value.

39. The method of claim 37, further comprising the step of enabling the user to override the replacement, and to reenter the entry.

* * * * *